United States Patent [19]

Konrad et al.

[11] Patent Number: 5,365,135
[45] Date of Patent: Nov. 15, 1994

[54] GENERATOR SLOT HOSE WEDGE ASSEMBLY

[75] Inventors: Kevin J. Konrad, Fort Payne, Ala.; Robert T. Ward, Winter Park, Fla.

[73] Assignee: Westinghouse Electric Corporation, Pittsburgh, Pa.

[21] Appl. No.: 152,648

[22] Filed: Nov. 12, 1993

[51] Int. Cl.$^5$ .................. H02K 3/487; H02K 15/00
[52] U.S. Cl. ........................ 310/214; 310/42; 29/596
[58] Field of Search ............ 310/42, 214, 215; 29/596, 598

[56] References Cited

U.S. PATENT DOCUMENTS

| | | | |
|---|---|---|---|
| 2,922,058 | 1/1960 | Bacon et al. | 310/214 |
| 3,139,550 | 6/1964 | Geer et al. | 310/214 |
| 3,624,432 | 11/1971 | Merz | 310/214 |
| 3,842,303 | 10/1974 | Simmonds et al. | 310/270 |
| 3,932,779 | 1/1976 | Madsen | 310/215 |
| 4,037,312 | 7/1977 | Deis | 310/214 |
| 4,200,818 | 4/1980 | Ruffing et al. | 310/214 |
| 4,228,375 | 10/1980 | Beermann et al. | 310/214 |
| 4,333,027 | 6/1982 | Madsen | 310/214 |
| 4,385,252 | 5/1983 | Butman, Jr. et al. | 310/214 |
| 4,607,183 | 8/1986 | Rieber et al. | 310/214 |

*Primary Examiner*—Steven L. Stephan
*Assistant Examiner*—Clayton E. LaBalle
*Attorney, Agent, or Firm*—G. R. Jarosik

[57] ABSTRACT

A wedge assembly for use in retaining a conductive winding in the core slot of a dynamoelectric machine including a conformable hose positioned within the core slot and cooperable with the conductive winding. The conformable hose is useful in minimizing movement of the conductive winding during operation of the dynamoelectric machine by filling gaps caused during the assembly process. The conformable hose may be filled with a resinous material under pressure and may be further looped over the end of and attached to the top of the slot wedge for use in retaining optionally used wedge locks.

6 Claims, 1 Drawing Sheet

5,365,135

GENERATOR SLOT HOSE WEDGE ASSEMBLY

BACKGROUND OF THE INVENTION

This invention relates generally to slot wedge assemblies for a dynamoelectric machine and, more particularly, relates to a slot wedge assembly for retaining a winding element in a winding slot of a dynamoelectric machine core member.

Conventionally, windings located in the slot portion of a generator rotor or stator are maintained in place by wedges located end-to-end and dovetailed against radial movement. These wedges serve to hold the windings secure against substantial electromagnetic and vibratory forces which tend to dislodge and move the windings whereby the life of the windings, wedges, and core member are reduced. To reduce the amount of potential movement within the slot, the wedges and slots are carefully machined to obtain a tight fit between the components for preventing axial displacement or rattling. Owing to the hostile operating environment, creepage and shrink of the slot components is common whereby any gaps and variances between the slot components may become magnified. The creepage and shrink tends to loosen the components and magnify any gaps or variances where the components are influenced by the electromagnetic and vibratory forces despite the careful machining. It is therefore known in the art to incorporate a resilient member, located between the wedge and winding, to aide in maintaining the wedge and winding in tight fitting arrangement within the slot despite any gaps or variances which may be present or arise. The use of the resilient member causes the wedge to be biased into positive contact with the engaging surfaces of the wedge receiving portion of the slot while the winding is secured under load within the slot thereunder.

While the employment of the resilient member is a step in solving the problem of loading and movement within the slot over the short term, movement none-theless continues to exist owing to the limited loading ability of the resilient member over time. Accordingly, a need exists to reduce tolerance requirements while providing a simplified yet dependable method of compensating for variances and gaps between the slot component parts over the continued operation of the dynamoelectric machine.

As a result of these excising needs, it is an object of the present invention to provide an improved wedging arrangement for securing a winding in the slot of a core.

Another object of the invention is to provide a wedging arrangement which compensates for variations and gaps among the slot component parts over an extended period of time.

Yet another object of the invention is to provide an improved wedging arrangement which is easy to assemble and yet will not come out of the slot inadvertently after assembly.

SUMMARY OF THE INVENTION

In accordance with the present invention, a dynamoelectric machine is provided consisting generally of a core member having a slot, a conductive winding disposed within the slot, and a wedge assembly disposed within the slot including a conformable hose cooperable with the conductive winding for use in minimizing movement of the conductive winding during operation of the dynamoelectric machine.

A better understanding of the objects, advantages, features, properties and relationships of the invention will be obtained from the following detailed description and accompanying drawings which set forth an illustrative embodiment and is indicative of the various ways in which the principles of the invention may be employed.

BRIEF DESCRIPTION OF THE DRAWINGS

For a better understanding of the invention, reference may be had to the preferred embodiments shown in the following drawings in which.

DETAILED DESCRIPTION

Figure 1:
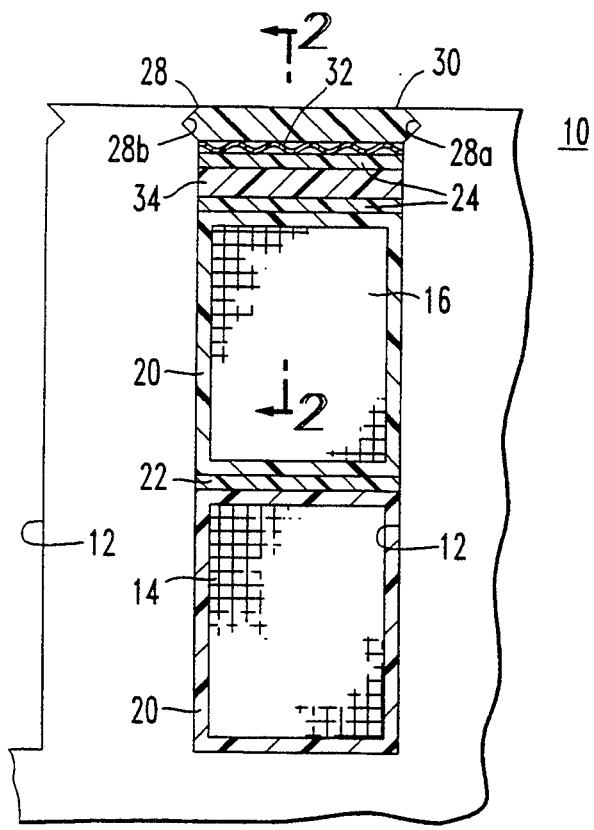
FIG. 1 is a partial sectional view showing the wedge assembly in accordance with the present invention.

While the invention can be used in core members in various dynamoelectric machines, it will be described hereinafter in the context of a slot wedge assembly for use in a stator of an electric generator as the preferred embodiment thereof.

Referring now to the figures, wherein like reference numerals refer to like elements, there is shown, generally at 10, a portion of a stator core of a dynamoelectric machine. As is conventional, stator core 10 is built up of a plurality of thin conductive laminations where each lamination includes one or more slots, which are aligned in the assembled stator core 10, to form slots 12 which extend the entire axial length of stator core 10. One or more conductive windings are conventionally disposed in each slot 12. By way of example, a bottom winding 14 may be disposed in the bottom of slot 12 and a top winding 16 may be disposed atop bottom winding 14. Conventional winding insulation 20 may be disposed about bottom winding 14 and top winding 16 and a layer of filler material 22, typically constructed from resinous laminates or mat material, may be disposed therebetween. A layer of similar filler material 24 may also be disposed atop top winding 16.

A dovetail slot 28 may be formed in slot 14 by opposed notches 28a and 28b spaced generally above the layer of filler material 24. A dovetail wedge 30 is fittable within dovetail slot 28 for providing a substantially pure, radial restraining force on top winding 16 and bottom winding 14. The dovetail wedge 30 may be constructed of a glass fiber core impregnated with a cured thermoset resin as shogun in U.S. Pat. No. 4,200,818, assigned to the assignee of the present invention and herein incorporated by reference. The wedge and wedge slot combination may also be of the type shown in U.S. Pat. No. 4,710,663, assigned to the assignee of the present invention and herein incorporated by reference.

Figure 2:
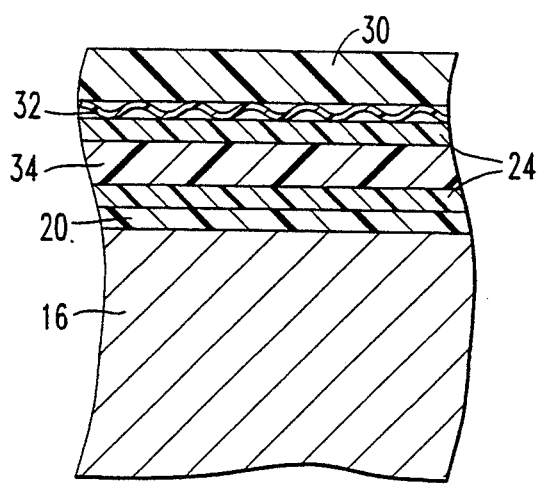
FIG. 2 is a section taken along the line II—II of FIG. 1 showing the assembly including an unfilled hose.

In a preferred embodiment of the invention, illustrated in the FIGS. 1 and 2, there is positioned between the length of the dovetail wedge 30 and the top winding 16 a prestressed driving strip 32 and a hose 34. Fillers 24 may be incorporated into the wedge assembly between wedge 30, prestressed driving strip 32, and hose 34 to ensure a uniform pressure on the prestressed driving strip 32. The prestressed driving strip 32 is constructed from a material having resilient properties while being non-metallic for obvious electrical safety reasons. In forming the prestressed driving strip 32, considerable latitude is available in the adjustment of pitch, amplitude, thickness, and properties of resilient device although "corrugated" type dimples are usually preferred to be formed along the full axial length of the strip.

In operation, the prestressed driving strip 32 functions to resiliently maintain the slot wedge 30 within dovetail slot 28 by maintaining the wedge surfaces in tight frictional contact with the dovetail slot walls thereby preventing rattling or displacement of the slot wedge 30. The prestressed driving strip 32 also functions to apply a winding seating force or loading upon the windings 14,16 whereby the windings 14,16 are maintained within the slot 12.

In accordance with the present invention, the hose 34 is used in the wedging assembly to enhance both the force provided upon the slot wedge 30 and more importantly the winding seating force applied upon the windings 14,16 whereby the prestressed driving strip 32 will be capable of compensating for any creepage or shrinkage which may occur over continued operation. As illustrated in FIG. 2, initially the hose, constructed of woven material such as Dacron, polyester or glass nylon with a reinforced film material lining such as polyurethane is positioned between the fillers 24 and under the prestressed driving strip 32. Adhesive backed Teflon tape may be applied to either side of the conformable hose to provide a slip layer for the system and to prevent strain during thermal cycling. Once the wedge 30 is placed within the slot 28 the hose 34 is filled or inflated so as to tighten the windings 14,16 within the slot 12. The inflated hose 34 operates to seat or move the windings 14,16 to their final seating position within slot 12 and to compress any conformable material such as fillers 22, 24 and prestressed driving strip 32 whereby the maintained compression of the prestressed driving strip 32 acts to enhance the secureness of the wedge 30 within slot 28 and the windings 14,16 within slot 12. More particularly, the filled hose 34 acts directly upon the windings 14,16 with the aide of prestressed driving strip 32 to minimize variations or gaps between the windings 14,16, fillers 24, wedge 30, and the slot 12 found over the entire axial length of the slot 12. As discussed, these variations or gaps may be the direct result of variances in the machining of the components, in the assembly of the components, or may arise from creepage and shrinkage during operation.

Initially, to achieve the inflation of the hose 34, gas, resin, or the like is pumped under pressure into the hose 34 where the hose 34 expands in accordance with the contours within the slot whereby the slot members are pushed to fill any variances or gaps. The filling pressure applied within the hose 34 varies in accordance with the dimensions of the stator and wedge assembly, however, typical filling pressures fall in the range of 150–270 psi. Once the desired pressure within the slot 12 is achieved, the hose 34 is filled with a thermoset resin, epoxy resin, or the like wherein the hose 34 will be "contoured or conformably set" whereby the fill pressure will be maintained on the slot elements to ensure continued minimization of any gap variances. Typically, as the resin within the hose 34 is setting, constant pressure is maintain by clamping the ends of the hose 34. Once the hose 34 has been finally cured so as to apply the radial load upon the prestressed driving strip 32, the windings 14,16, and any fillers used in the stator slot, the unfilled hose ends are cut from the inlet and outlet manifolds to prevent the loose ends from flapping into the rotor air gap. Once cut, the loose ends may be further sealed to hydraulically secure the cured resin within the hose 34.

Figure 3:
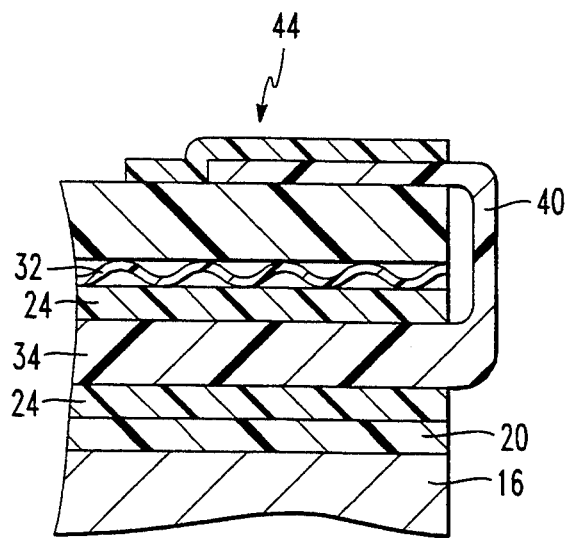
FIG. 3 shows a partial sectional view of an alternative embodiment of the invention.

In a further embodiment of the invention, shown in FIG. 3, the wedge 30 is further locked within the slot by looping the loose end 40 of the inflated hose 34 from under the wedge 30 back 180 degrees over the top of the same wedge 30 wherein the loose end 40 may be attached to the wedge ends with an adhesive or the like. This attachment further prevents migration of the hose 34 from the slot which may result from vibration in the dynamoelectric machine. Furthermore, should body wedges 42 be employed to assist in securing the wedge 30 within the slot, the 180 degree loop over the wedge 30 further acts to prevent axial movement of the body wedge 30 from the stator slot. Examples of such body wedges may be found in U.S. Pat. No. 3,139,550, incorporated herein by reference. The attachment of the loose end 40 over the end of the wedge 30 may be further secured by employing a band 44 in addition to or in substitution for the adhesive. The band 44, may be constructed from woven polyester or glass material with resin impregnation.

It is to be noted that the described wedge assembly, and variations thereof within the spirit of the invention, may be retrofitted into existing dynamoelectric machines by removing the existing wedges and installing the new material in a manner similar to the one above described.

It should be apparent from the preceding description that this invention has among other advantages, the advantage of minimizing gap variances as well as augmenting the loading of the resilient member whereby movement within the slot is minimized.

It is to be understood that the descriptions and drawings shown with respect to the present invention are not limiting and that other slot wedge arrangements utilizing the concepts of the present disclosure are contemplated.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

We claim:

1. A dynamoelectric machine, comprising
   a core member having a slot;
   a conductive winding disposed within said slot; and
   a wedge assembly disposed within said slot, comprising wedge and a conformable hose filled with a thermoset resin, cooperable with said conductive winding for use in minimizing movement of said conductive winding during operation of said dynamoelectric machine, wherein a portion of said conformable hose is looped over said wedge to attach said conformable hose thereto.

2. The dynamoelectric machine of claim 1, wherein said conformable hose is sealed with an adhesive.

3. The dynamoelectric machine of claim 1, further comprising a band attached to said wedge and positioned over said conformable hose for further securing said hose to said wedge.

4. A method for securing a conductive winding within a slot of dynamoelectric machine, comprising the steps of:

positioning within said slot said conductive winding;

positioning within said slot in cooperation with said conductive winding a conformable hose;

sealing said slot with a wedge assembly;

inflating said conformable hose with a thermoset resin;

sealing said conformable hose; and attaching said conformable hose to said wedge assembly by looping a portion of said conformable hose over said wedge assembly.

5. The method as recited in claim 4, further comprising the step of banding said conformable hose to said wedge assembly.

6. The method as recited in claim 4, further comprising the step of deploying a body wedge within said slot to further secure said wedge assembly.

* * * * *